Feb. 27, 1968  I. NICOLAU ET AL  3,370,471
MEANS FOR MEASURING FLUID DENSITY
Filed Aug. 21, 1964
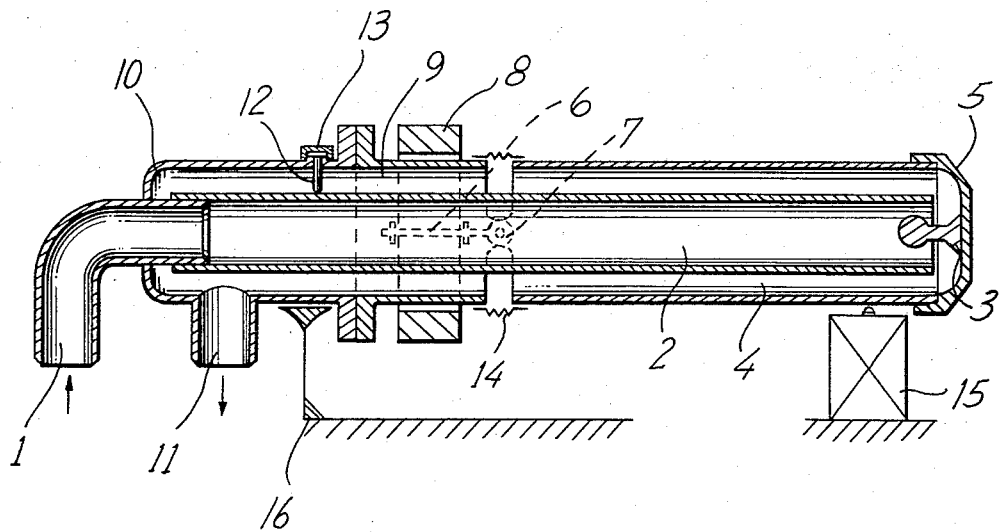
INVENTORS
IOAN NICOLAU
LEON DOGARU
CONSTANTIN EVGHENIDE
ARION IONASCUT
NICOLAE TIHON
VALERIU MOTOROIU
BY
ATTORNEY de# United States Patent Office 3,370,471
Patented Feb. 27, 1968

3,370,471
MEANS FOR MEASURING FLUID DENSITY
Ioan Nicolau and Leon Dogaru, Campina, Constantin Evghenide, Bucharest, Arion Ionascut and Nicolae Tihon, Campina, and Valeriu Motoroiu, Comuna Poiana, Rumania, assignors to Ministerul Petrolului, Bucharest, Rumania
Filed Aug. 21, 1964, Ser. No. 391,838
Claims priority, application Rumania, Aug. 22, 1963, 46,829
4 Claims. (Cl. 73—434)

The present invention relates to a device for continuously and automatically measuring fluid density, operating on the pycnometer principle.

Various devices of the pycnometer type are known for continuously and automatically measuring fluid density by means of a pneumatic or electrical weight transducer directly weighing a constant and known volume of fluid flowing continuously through a detector comprising a U-tube pivoted about its ends and provided with two flexible sleeves opposite the pivots. The disadvantages of these fluid density meters is their limited accuracy due to errors resulting from the rigidity of the flexible sleeves, and the difficulties encountered in building a perfect U-shaped tube. A further disadvantage is that these density meters require a special dampener to eliminate undesirable U-tube movements caused by the turbulent flow of the circulated fluid being measured.

The density fluid meter described in the present invention eliminates the above disadvantages in that it uses a detector consisting of concentric tubes, comprising an outside tube pivotally mounted, provided with a sealing cap and a single flexible sleeve, and an inner fixed tube, so that the fluid enters the inner tube and flows out through the annulus between the tubes, whereby the fluid amount corresponding to the inside volume of the outside, pivotally mounted tube is measured by means of a pneumatic or electrical weight transducer.

An example of application of the present invention, referring to the drawing which shows a longitudinal cross-section through the apparatus, is described in the following:

The fluid density meter according to the invention comprises an inlet 1, to which an inner fixed conduit 2 is connected. At the other end of the conduit a flow straightener 3 is fitted. The pivotally mounted outside tube 4, concentric with the inner fixed conduit 2, slightly tapered on the inside to avoid hydrodynamic reactions, is provided with a sealing cap 5, of suitable inner shape. To insure free vertical movement of the pivotally mounted outside tube 4, its extending arms 6 carry a linkage 7, of known type, involving two ballbearings with minimised friction, or two pairs of flat leaf springs mounted at right angles to each other. The extending arms 6 carry also a ring counterbalance weight 8, adjustably mounted to allow its position to be changed with respect to linkage 7, the counterbalance weight serving to balance the weight of the outside tube 4 when empty. The outside tube 4 is flexibly coupled to the outside fixed tube 9, which is connected to the fixed member 10, said member 10 being provided with the outlet 11. The inner fixed conduit 2 is positioned co-axially with the outside fixed tube 9 and the pivotally mounted outside tube 4, by means of a centering device of known type, comprising three adjusting screws 12, fitted with sealing caps 13, or any other known type of centering device. The outside tube 4 is connected to the outside fixed tube 9 by means of a flexible sleeve 14 either of the O-ring sleeve type, or a rigid hose, or bellows of fixed volume, or otherwise.

In order to measure the fluid amount corresponding to the inside volume of the pivotally mounted outside tube 4, a weight transducer 15 is used, of pneumatic or electric type, provided with suitable indicating and recording means. For the apparatus to be aligned in a strict horizontal position, the base 16 is used, containing the necessary means.

Operation of the fluid density meter described in the present invention is as follows: the fluid to be measured is continuously supplied to inlet 1, at a low flow rate and pressure required by the design of the detector. The fluid then flows further through the inner fixed conduit 2, changing its direction at an angle of 180° with minimum losses and low tendency to turbulence and settling on the tube walls owing to the flow straightener 3 and the inner shape of cap 5, then the fluid passes through the annulus between the outside tube 4, the outside fixed tube 9 and the inner fixed conduit 2, and leaves the apparatus through the outlet 11 to return into the main circulating stream. The fluid to be measured may also be supplied in the reversed direction. In this case the inner conicity of the outside tube 4 must also be reversed. The fluid amount corresponding to the inside volume of the outside tube 4 is continuously measured by the weight transducer 15.

Calibration of the apparatus can be made in an empty condition, whereby the counterbalance weight 8 allows the working parts pivoting around linkage 7 to be balanced. In this case, the pivotally mounted outside tube 4 will always tend to rotate downwardly around linkage 7, for any values on the apparatus scale. Calibration of the apparatus can also be carried out when filled with a reference fluid, by using again the counterbalance weight 8, balancing both the weight of the working parts relative to linkage 7, and the weight of the fluid corresponding to the inside volume of the outside tube 4. In this case, the pivotally mounted outside tube 4 will tend to rotate downwardly or upwardly, depending on whether the measured fluid density is higher or lower than that of the reference fluid used for the calibration. If the temperature of the measured fluid changes, it is possible to correct for these changes by using a special device for correcting temperature variations, acting directly upon the weight transducer. The position of the inner fixed conduit 2 relative to the outside pivotally mounted tube 4 allows the measured fluid to act as a damper-fluid, thereby eliminating the undesirable movements of the outside tube 4 which are produced by the turbulent flow of the measured fluid by self-dampening.

The fluid density meter according to the invention has the following advantages:

The detector comprising the concentric tubes requires only one flexible sleeve, reducing thereby the errors resulting from the rigidity of the two flexible sleeves used at present;

The manufacture and centering of the detector are simplified and its geometry is more accurate since all working parts of the detector are solids of revolution;

Self-damping of the undesirable movements of the detector is possible;

The size of the detector is reduced.

What is claimed is:
1. An apparatus of the character described for automatically and continuously measuring fluid density, comprising in combination,
   a fixed inner tube having an opening at one end, and the other end being open and positioned in a horizontal plane;
   a first outer tube portion substantially concentrically securely arranged with respect to said inner tube, said first outer tube portion having an opening at one end and the other end being open;
   a second outer tube portion substantially concentrically arranged with respect to said inner tube and having an open end adjacent to said open end of said first outer tube portion and said second outer portion also having a closed end, adjacent to said open end of said inner tube, said second outer tube portion being pivotally connected to said first outer tube portion and being movable with respect to said inner tube;

flow reversal means mounted at the end of said second outer tube portion which is remote from said first outer tube portion for reversing the flow of said fluid;

fluid tight flexible connecting means joining said first and second outer tube portions, means for biasing said second outer tube in an upward direction;

and means for detecting the magnitude of vertical movement of said second outer tube portion with respect to said first outer tube portion and with respect to said inner tube operatively connected to said second outer tube portion;

whereby fluid passes through said opening of said inner tube and flows through the annulus between said inner tube and said first and second outer tube portions and exits from said opening of said outer tube portion; the fluid density of said fluid being determined by the measurements of the vertical movements of said second outer tube portion with respect to said inner tube by said detecting means; conversely said fluid may flow in the reverse direction without affecting the operability of said apparatus.

2. The apparatus as set forth in claim 1, wherein said first and second outer tube portions are slightly tapered in accordance with the flow direction of said fluid so that the size of said opening, functioning as an outlet, is larger than the size of said opening, functioning as an inlet in order to minimize hydrodynamic reactions in said apparatus.

3. The apparatus as set forth in claim 1, wherein said fluid tight flexible connecting means include biasing means operatively connected to said first and second outer tube portions and adapted to cooperate with said detecting means, which are operatively connected to said second outer tube portion, and a flexible sleeve connecting said first and second outer tube portions.

4. The apparatus as set forth in claim 3, including centering means operatively mounted in said first outer tube portion for adjusting the position of said inner tube with respect to said first outer tube portion.

References Cited

UNITED STATES PATENTS

| | | | |
|---|---|---|---|
| 2,432,039 | 12/1947 | Plank | 73—434 |
| 3,187,584 | 6/1965 | Hudson | 73—434 |

FOREIGN PATENTS

| | | |
|---|---|---|
| 12,197 | 1913 | Great Britain. |

RICHARD C. QUEISSER, *Primary Examiner.*

J. J. GILL, *Examiner.*

J. D. SCHNEIDER, *Assistant Examiner.*